US011425165B2

United States Patent
Zheng et al.

(10) Patent No.: US 11,425,165 B2
(45) Date of Patent: Aug. 23, 2022

(54) METHODS, SYSTEMS, ARTICLES OF MANUFACTURE AND APPARATUS TO REDUCE SPOOFING VULNERABILITIES

(71) Applicant: McAfee, LLC, Santa Clara, CA (US)

(72) Inventors: Yi Zheng, Los Gatos, CA (US); Ameya Sanzgiri, Fremont, CA (US)

(73) Assignee: MCAFEE, LLC, San Jose, CA (US)

( * ) Notice: Subject to any disclaimer, the term of this patent is extended or adjusted under 35 U.S.C. 154(b) by 382 days.

(21) Appl. No.: 16/430,938

(22) Filed: Jun. 4, 2019

(65) Prior Publication Data
US 2020/0389492 A1 Dec. 10, 2020

(51) Int. Cl.
*H04L 9/40* (2022.01)
*H04L 9/32* (2006.01)

(52) U.S. Cl.
CPC ........ *H04L 63/1483* (2013.01); *H04L 9/3213* (2013.01); *H04L 9/3265* (2013.01); *H04L 9/3273* (2013.01); *H04L 9/3297* (2013.01); *H04L 63/0807* (2013.01); *H04L 63/0869* (2013.01); *H04L 63/126* (2013.01)

(58) Field of Classification Search
CPC ............. H04L 63/1483; H04L 63/0869; H04L 63/0807; H04L 63/126; H04L 9/3265; H04L 9/3297; H04L 9/3213; H04L 9/3273
See application file for complete search history.

(56) References Cited

U.S. PATENT DOCUMENTS

| 10,044,707 | B1* | 8/2018 | Ji ........................ H04L 63/0853 |
| 2007/0061590 | A1* | 3/2007 | Boye .................... H04L 63/083 |
| | | | 713/186 |
| 2013/0333002 | A1* | 12/2013 | Belton .................. H04L 63/101 |
| | | | 726/5 |

(Continued)

OTHER PUBLICATIONS

Othman, Asem; Callahan, John; "The Horcrux Protocol: A Method for Decentralized Biometric-based Self-sovereign Identity", International Joint Conference on Neural Networks (IJCNN), IEEE, Jul. 8-13, 2018, 7 pages.*

Gulati, Himani; Huang, Chin-Tser; "Self-Sovereign Dynamic Digital Identities based on Blockchain Technology" SoutheastCon, IEEE, Apr. 11-14, 2019, 6 pages.*

*Primary Examiner* — Victor Lesniewski
(74) *Attorney, Agent, or Firm* — Hanley, Flight & Zimmerman, LLC

(57) ABSTRACT

Methods, systems, articles of manufacture and apparatus are disclosed to reduce spoofing vulnerabilities. An example apparatus to verify token integrity for a computing device includes an artifact engine to store first artifact data with a first timestamp in a device artifact storage, and store second artifact data with a second timestamp in the device artifact storage. The example apparatus includes an offchain identification protector (OIP) controller to generate a first token based on the first artifact data and the first timestamp, the first token to establish a first entry in a blockchain at a first time, and generate a second token based on the second artifact data, the second timestamp, and the first token, the second token to establish a second entry in the blockchain at a second time after the first time. The example apparatus also (Continued)

includes a verify engine to select the first or the second artifact from the device artifact storage, and search for a match of the selected first or second artifact in the blockchain to verify an integrity of the second token at a third time.

20 Claims, 13 Drawing Sheets

(56) References Cited

U.S. PATENT DOCUMENTS

| | | | |
|---|---|---|---|
| 2014/0237564 A1* | 8/2014 | Dudziak | H04L 63/08 |
| | | | 726/6 |
| 2018/0285996 A1* | 10/2018 | Ma | G06F 16/2428 |
| 2019/0020468 A1* | 1/2019 | Rosenoer | H04L 63/0414 |
| 2019/0036906 A1* | 1/2019 | Biyani | H04L 9/3247 |
| 2019/0065709 A1* | 2/2019 | Salomon | G06F 21/44 |
| 2019/0378142 A1* | 12/2019 | Darnell | G06F 21/645 |
| 2020/0057848 A1* | 2/2020 | Hecht | H04L 63/1425 |
| 2020/0076625 A1* | 3/2020 | Kass | H04L 9/3239 |
| 2020/0092102 A1* | 3/2020 | Wang | H04W 12/06 |
| 2020/0186354 A1* | 6/2020 | Balinsky | H04L 9/3247 |
| 2020/0195436 A1* | 6/2020 | Khan | G06F 21/45 |
| 2020/0311646 A1* | 10/2020 | Koenig | H04L 9/30 |
| 2020/0382306 A1* | 12/2020 | Wang | G06F 21/602 |

* cited by examiner

METHODS, SYSTEMS, ARTICLES OF MANUFACTURE AND APPARATUS TO REDUCE SPOOFING VULNERABILITIES

FIELD OF THE DISCLOSURE

This disclosure relates generally to computing device security, and, more particularly, to methods, systems, articles of manufacture and apparatus to reduce spoofing vulnerabilities.

BACKGROUND

In recent years, an identity of a user in a transaction has become an important construct to enable services in a networked environment. The identity of the user permits and/or otherwise facilitates successful financial transactions, network data transactions (e.g., e-mail) and/or security transactions (e.g., door lock/unlock). However, spoofing occurs when a hacker impersonates a device or a user, thereby causing a perception that the device or the user is legitimate. Such spoofing activity can result in informational theft and/or financial loss to people and entities associated with the identity that has been spoofed.

BRIEF DESCRIPTION OF THE DRAWINGS

The figures are not to scale. In general, the same reference numbers will be used throughout the drawing(s) and accompanying written description to refer to the same or like parts.

Figure 1:
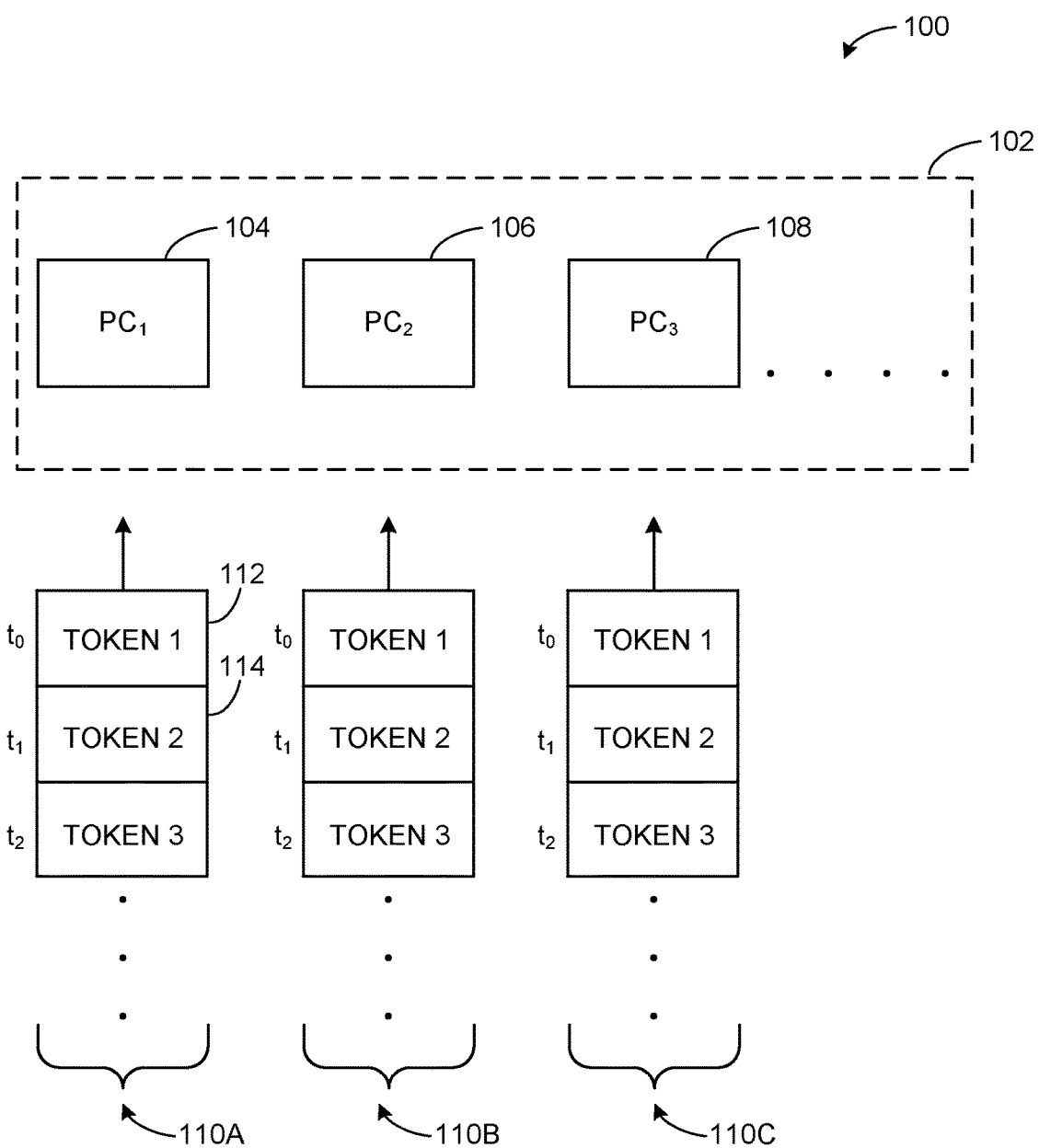
FIG. 1 is a schematic illustration of an example portion of a blockchain system suitably constructed in accordance with teachings of this disclosure to reduce spoofing vulnerabilities.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Spoofing is a threat to digital communication that, in some circumstances, is difficult to detect. Hackers frequently spoof a number of resources in an effort to appear as a legitimate party in one or more digital communication activities. Spoofing uses one or more characteristics of an identity (ID) associated with a legitimate person, company, device and/or other entity. Characteristics that may be spoofed include, but are not limited to, Internet protocol (IP) addresses, machine/device identifiers (IDs), credit card numbers, social security numbers, address information, usernames, passwords, etc. Such example characteristics allow legitimate users to access different types of (digital) assets, such as bank accounts, social media accounts, merchant accounts, security services, etc.

Efforts to prevent spoofing include using particular combinations of usernames and passwords having particular complexity parameters. For instance, some assets (e.g., bank accounts) require that passwords have a threshold character length, use a particular quantity of alphabetic cases, use a particular quantity of numbers, and/or use a particular quantity of non-alphabetic and/or non-numeric characters. In still other examples, efforts to prevent spoofing include using multi-factor authentication (MFA) techniques, such as particular combinations of passwords and biological indicators (e.g., voiceprint, fingerprint, retina print, etc.). However, because such biological indicators and/or passwords are merely items of information compared to a reference in an authentication process/mechanism, such information can be acquired by a hacker and used during authentication procedures.

Examples disclosed herein reduce spoofing vulnerabilities associated with user devices by, in part, building a digital ID that does not suffer from information theft risks. As described in further detail below, examples disclosed herein utilize data sources that are persistent with a user, and facilitate a degree of dynamic variability during authentication task(s) that has a low likelihood of being spoofed. Additionally, examples disclosed herein utilize blockchain resources that allow the data sources to persist as read-only data that cannot be decrypted or modified by hackers without detection. Stated differently, because a blockchain maintains a backward certified list of encrypted tokens, any attempts to modify will be detected by blockchain participants during a certification check. Additionally, the mere acquisition of the blockchain itself will not permit a hacker access to the information stored therein.

As used herein, a token is a hashed data value generated by a blockchain system. In some examples the hashed data value includes a previously generated token (if any) and custom user data, such as data artifacts. One or more tokens form the basis for a user identifier. As used herein, custom user data and data artifacts are used interchangeably to include, but not limited to, password data, human biological indicators (e.g., fingerprint data, retina data, voiceprint data, heart-rate data, etc.), location data, ambient temperature data, etc. Generally speaking, a blockchain system includes any number of participating computational devices (e.g., computers, servers, etc.) that store a chain of tokens. Each token may be generated in a manner consistent with example Equation 1.

$$\text{Token} = \text{SHA3}(\text{Salt}) + \text{SHA3}(\text{DATA} + \text{Previous Token}) \quad \text{Equation 1.}$$

In the illustrated example of Equation 1, a secure-hash-algorithm (SHA) version 3 is used, but any other hashing technique may additionally or alternatively be used when hashing a salt value, user data and the previously-generated token. As used herein the combination of DATA and the Previous Token of example Equation 1 is referred to as a "package" or "data package."

FIG. 1 illustrates an example portion of a blockchain system 100 that includes any number of participating computing devices 102. In the illustrated example of FIG. 1, the computing devices 102 include a first computing device 104 (PC1), a second computing device 106 (PC2) and a third computing device 108 (PC3). Each participating computing device receives a corresponding copy of a blockchain 110. In the illustrated example of FIG. 1, the first computing device 104 receives a first copy of the blockchain 110A, the second computing device 106 receives a second copy of the blockchain 110B, and the third computing device 108 receives a third copy of the blockchain 110C. All of these copies of the blockchain 110A, 110B, 110C are identical. In other words, each copy of the blockchain (e.g., 110A, 110B, 110C) is the same as any other blockchain copy such that any differences that are detected can be identified and purged from the blockchain system 100 in the event of a hacking attempt. Because the blockchain system 100 includes multiple copies of the same blockchain, and multiple different computing devices can verify an entry to the blockchain, anomalies can be identified and purged.

In the illustrated example of FIG. 1, the first copy of the blockchain 110A includes a first token 112 generated as the first token in the blockchain at time to. In some examples, the first token 112 is generated in a manner consistent with example Equation 1, except that no prior token existed and the first token 112 is based on the salt and data. In the illustrated example of FIG. 1, the first copy of the blockchain 110A includes a second token 114 generated in a manner consistent with example Equation 1. In particular, the example second token 114 includes the example first token 112 in a nested manner, but with alternate data and/or salt value(s). As such, ongoing instances of tokens are generated to form a nested chain that is sometimes referred to as a backward certified token list. In the event of a suspected blockchain entry by a hacker, examples disclosed herein facilitate token verification that utilizes a historical record of prior data artifacts. Stated differently, while a hacker may be able to obtain a relatively small number of data artifacts associated with a user, the chances of the hacker having access to a historical library of such data artifacts is believed to be statistically low (e.g., impossible). Because the blockchain is encrypted, such as via a public/private key pair, mere interception or theft of the blockchain itself will not allow the hacker to learn and/or otherwise reveal the contents therein. However, hash challenges with the blockchain still permit authentication verification (e.g., via hash matching).

Additionally, as the number of blockchain entries grows, the corresponding history depth of the data artifacts (e.g., user data) grows, thereby generating a historical suite. Each data artifact can be used to perform validity checks on a token. As such, challenges to a suspected fraudulent token include a selection of particular data artifacts that have previously occurred at specific temporal instances in the past that the hacker does not possess, thereby exposing the fraudulent token and/or spoofing attempt. Furthermore, each token (e.g., the example first token 112) includes a specific artifact (e.g., a GPS location of the user device) and a specific timestamp at which the artifact occurred or was stored. As such, in the event a hacker attempts to spoof a user device, a verification process (as described in further detail below) can be used to challenge the requesting entity (e.g., the hacker) to provide one or more instances of (a) the specific artifact and (b) the specific time at which that artifact occurred (or was stored). In the event the hacker has at least one stolen token with corresponding artifact information and timestamp information, examples disclosed herein further verify the integrity of the provided token by generating a subsequent challenge to the requesting entity for a second combination of (a) a specific artifact and (b) a specific time at which the artifact occurred. Because the hacker is unlikely to possess the deep history of artifact occurrences and associated timestamps, then attempts to verify such information against the blockchain are believed to be low (e.g., impossible).

Figure 2:
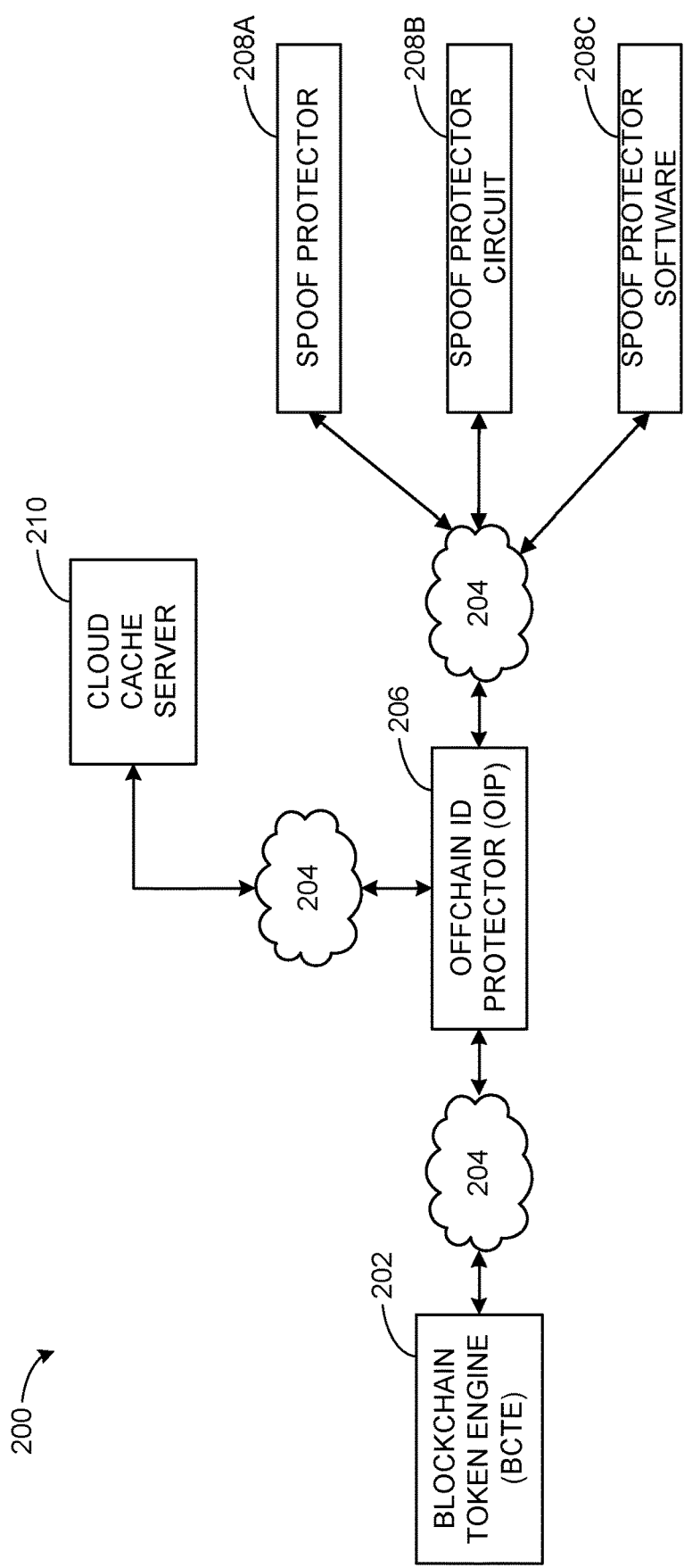
FIG. 2 is a schematic illustration of a spoofing prevention system to reduce spoofing vulnerabilities constructed in accordance with teachings of this disclosure.

FIG. 2 is a schematic illustration of a spoofing prevention system 200. In the illustrated example of FIG. 2, the spoofing prevention system 200 includes a blockchain token engine (BCTE) 202 that operates as a blockchain service with any number of participating computing devices (e.g., $PC_1$ 104, $PC_2$ 106, $PC_3$ 108, etc.). Such participating computing devices may be communicatively connected to the example BCTE 202 via an example network 204. The example BCTE 202 is communicatively connected to an example offchain identification (ID) protector (OIP) 206. In the illustrated example of FIG. 2, the OIP 206 facilitates communication between the BCTE 202 and any number of spoof protectors 208. While the illustrated example of FIG. 2 includes a first spoof protector 208A, a second spoof protector circuit 208B and a third spoof protector software 208C, the term "spoof protector" will generally be used herein to refer to either implementation of the structure or software. Examples disclosed herein may include any number of spoof detectors 208. The example spoof protectors 208 may be located in user computing devices including, but not limited to, laptop computers, desktop computers, tablets, smart-watches, wireless telephones, etc. Further discussion will refer to the example first spoof protector 208A as a matter of convenience and not limitation, in which the example first spoof protector 208A is located in a user device (e.g., a smartphone). The example OIP 206 is also communicatively connected to one or more cloud cache server(s) 210 (also referred to as a cloud storage device) via the example network 204.

In operation, the example spoof protector 208A (e.g., within a user cell-phone) controls and/or otherwise orchestrates tasks of the example spoofing prevention system 200, including control of the OIP 206 tasks, the BCTE 202 tasks, and the cloud cache server 210 tasks. The example spoof protector 208A initially creates a token to be used with authentication for a service (e.g., a banking service, a login service for social media, etc.). Requests to create a new or updated token are sent by the example spoof protector 208A to the example OIP 206 as an 'update' request, and requests to verify a token are sent by the example spoof protector 208A to the example OIP 206 as a 'verify' request. Example update requests occur at a cadence/frequency dictated and/or otherwise controlled by the spoof protector 208A such that any such requests outside an identified cadence are treated as suspicious and subject to additional scrutiny. As described above, new/updated tokens include a prior token and artifact data (e.g., a particular GPS location at that time, a particular ambient temperature at that time, a particular list of apps on a user cell phone at that time, etc.). The example OIP 206 sends such information to the example BCTE 202 such that a new token is generated at that particular time. In other words, the new token has a particular timestamp associated with a specific combination of artifact data associated with that timestamp. This new token is stored as another link in the blockchain, and that blockchain is distributed to other participating computing devices and verified in a manner consistent with blockchain systems.

The example newly generated token is sent back to the example spoof protector 208A via the OIP 206 and stored in a memory of the spoof protector 208A. In the event the example spoof protector 208A is to verify that a particular token is authentic and/or otherwise valid (e.g., validity checks may occur on a frequency designated by the example spoof protector 208A, based on a flag indicative of suspicious activity associated with the token in question, based on a request from a third-party entity (e.g., an online bank)), the validity check request is forwarded from the spoof protector 208A to the example BCTE 202 via the OIP 206. The example BCTE 202 performs a hash verification check of the token in question using the nested data of the blockchain and, if valid, sends an indication of validity to the example OIP 206. The OIP 206 stores valid tokens in the example cloud cache server 210 for later retrieval, and also sends the indication of validity to the example spoof protector 208A that made the original request. In some examples, third-party entities retrieve the valid tokens from the example cloud cache server 210 as part of an authentication process for the user/device associated with the example spoof protector 208A. However, tokens that do not pass the verification process imposed by the example BCTE 202 are flagged as suspicious in the example cloud cache server 210 and the requesting spoof protector 208A. Such occurrences initiate and/or otherwise facilitate a subsequent process to generate a new token that uses specific data artifacts that are only known to the artifact storage of the user device, as described in further detail below.

Figure 3:
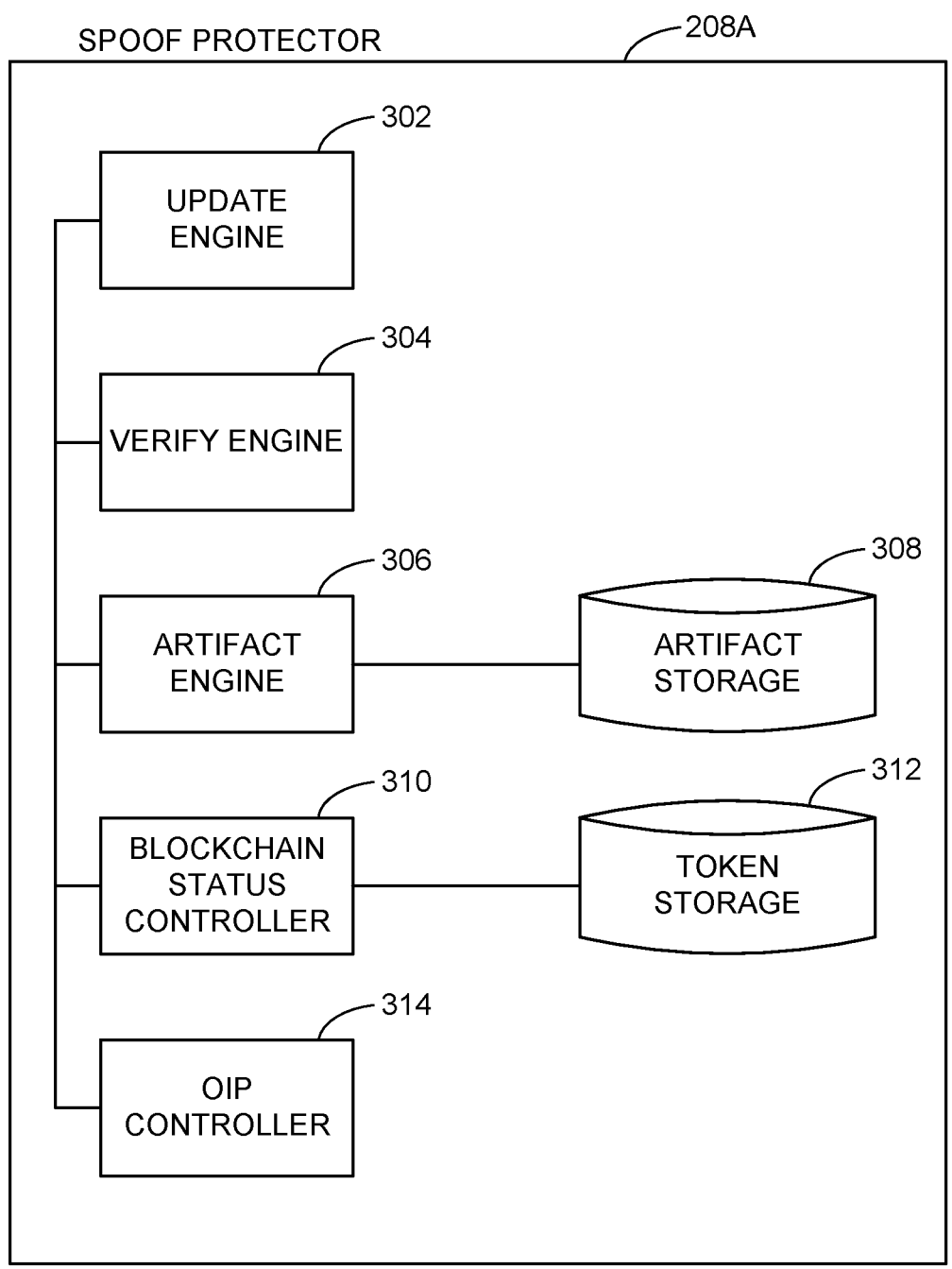
FIG. 3 is an illustration of an example implementation of the spoof protector of FIG. 2.

FIG. 3 illustrates additional detail associated with the example spoof protector 208 (e.g., 208A). In the illustrated example of FIG. 3, the spoof protector 208A includes an example update engine 302, an example verify engine 304, an example artifact engine 306, an example artifact storage 308 (sometimes referred to herein as a device artifact storage), an example blockchain status controller 310, an example token storage 312, and an example OIP controller 314. In operation, the example spoof protector 208A can perform an update operation, a verify operation and/or artifact generation operation(s). Typically, the example spoof protector 208A begins by invoking the update operation, particularly in circumstances in which a blockchain for the user device has not yet been started. The example blockchain status controller 310 determines whether there is an existing blockchain and, if not, the example spoof protector 208A invokes the example artifact engine 306 to retrieve artifacts. The example OIP controller 314 forwards the retrieved artifacts and previous token (if any) to the example OIP 206 with an update request (e.g., an update command containing parameters of the artifacts, associated timestamp information, and the previous token). The example update request invoked by the example OIP controller 314 causes the example BCTE 202 to compute a new token, which is forwarded back to the example spoof protector 208A via the example OIP 206.

In some examples, the example verify engine 304 responds to newly generated tokens with a verification operation as a matter of course after the spoof protector 208A invokes the update operation. In some examples, the verify engine 304 invokes the verification operation in response to an indication of suspicious activity. As described above, in some examples the verify engine 304 is triggered by a request from a third-party entity one or more times to confirm an indication of integrity with a token to be used for authentication purposes. Generally speaking, because the example spoof protector 208A is in control of which specific artifacts (and associated timestamps of their creation) are to be used for verification, the chances that the hacker has all of such artifacts is relatively low. Artifacts used for verification by the example spoof protector 208A may be based on a random (e.g., random, pseudo-random) selection (by the example artifact engine 306) of available artifact data from the example artifact storage. Such artifact data is associated with the user and/or the user device (e.g., a wireless phone on which the example spoof protector 208A is located). In some examples, artifacts selected by the artifact engine 306 include previously acquired GPS coordinates of the wireless phone, an international mobile equipment identity (IMEI) number of the wireless phone, a media access control (MAC) address of the wireless phone, etc.

The artifact data is collected by the example artifact engine 306 at a frequency/cadence controlled by the example spoof protector 208A. In some examples, the artifact engine 306 invokes a graphical user interface (GUI) and/or other audio/visual prompt on the user device (e.g., wireless phone) from time-to-time to request entry of a phrase (e.g., "Please enter a random phrase."), entry of a word (e.g., "Please enter a random word."), or entry of random (e.g., pseudo-random) text (e.g., "Please enter six (6) random characters."). In effect, because the phrase is spontaneous and potentially unrelated to characteristics of the user, such artifacts become a read-only moment in the blockchain history that an attacker is unlikely to know for spoofing. In some examples, the previously collected artifact data stored in the example artifact storage 308 is encrypted, further reducing the possibility that a hacker can associate specific artifact data and timestamp combinations to be used for verification purposes.

Returning to the illustrated example of FIG. 3, the example artifact engine 306 selects an artifact from the example artifact storage 308 to be used to verify the current token. Additionally, the example artifact engine 306 packages the selected artifact with the token (e.g., package the information as a data packet) in a format acceptable to the example OIP 206. For instance, the selected artifact is associated with a specific timestamp indicative of the date/time on which it was obtained. This specific combination of (a) artifact data and (b) date on which the artifact was obtained was previously added to the blockchain. The example OIP controller 314 forwards the package to the example OIP 206 with a verify request to cause the OIP 206 to send the verify request to the blockchain system (e.g., the example BCTE 202). The example verify request by the example OIP controller 314 also causes the results of the verify operation performed by the blockchain system to be forwarded back to the OIP controller 314 via the example OIP 206. The verify operation by the blockchain system (e.g., the example BCTE 202) determines whether the provided (a) artifact data and (b) date on which that artifact data was obtained exists in the blockchain. In other words, in the event the hacker does not have this specific combination, then the blockchain system verify operation returns an indication of failure.

In some examples, two or more verify operations are demanded before network services (e.g., authentication) are permitted. For example, in the event there is any concern that the hacker has at least one combination of (a) artifact data and (b) a corresponding date on which that artifact was established, a subsequent verify operation may be invoked using a random (e.g., pseudo-random) selection of another combination of (a) artifact data and (b) a corresponding date on which that artifact was established. As described above, the results of the verify operation are the result of an authentication check of the aforementioned combination, and those results, if valid, cause the example OIP controller 314 to store the token in the example cloud cache server 210, and cause the example blockchain status controller 310 to store the token in the example token storage 312. In other words, a token that is verified is designated as valid (verified) and is designated as the current token (e.g., by the example verify engine 304). In some examples, the spoof protector 208A provides the third-party entity with access information to the verified/valid tokens stored in the example cloud cache server 210. In some examples, the cloud cache server 210 operates as a certificate authority.

However, in the event the verify operation results in verification failure, the example verify engine 304 reports this verification failure (e.g., via a GUI presented and/or otherwise generated by the example spoof protector 208A) to the user so that remediation efforts can begin to establish a (new) trusted token. Additionally, because the current token is now associated with an indication of suspicion, fraud and/or any other anomaly, the example verify engine 304 flags the current token as unverified (e.g., designates the token as unverified/unauthorized) in the example cloud cache server 210 and in the example token storage 312. In some examples, unverified and/or otherwise suspicious tokens are removed from the example cloud cache server 210 and/or the example token storage 312 (e.g., by the OIP controller 314) to prevent unauthorized access to digital services. The example update engine 302 invokes a token reestablishment procedure by performing a new update procedure, as described above. In some examples, the example update engine 302 flags the new update procedure to follow-up the update procedure with two or more verify procedures to ensure the new token is valid. In some examples, the update engine 302 invokes the generation of an alternate token to replace a token previously identified and/or otherwise designated as unverified.

Figure 4:
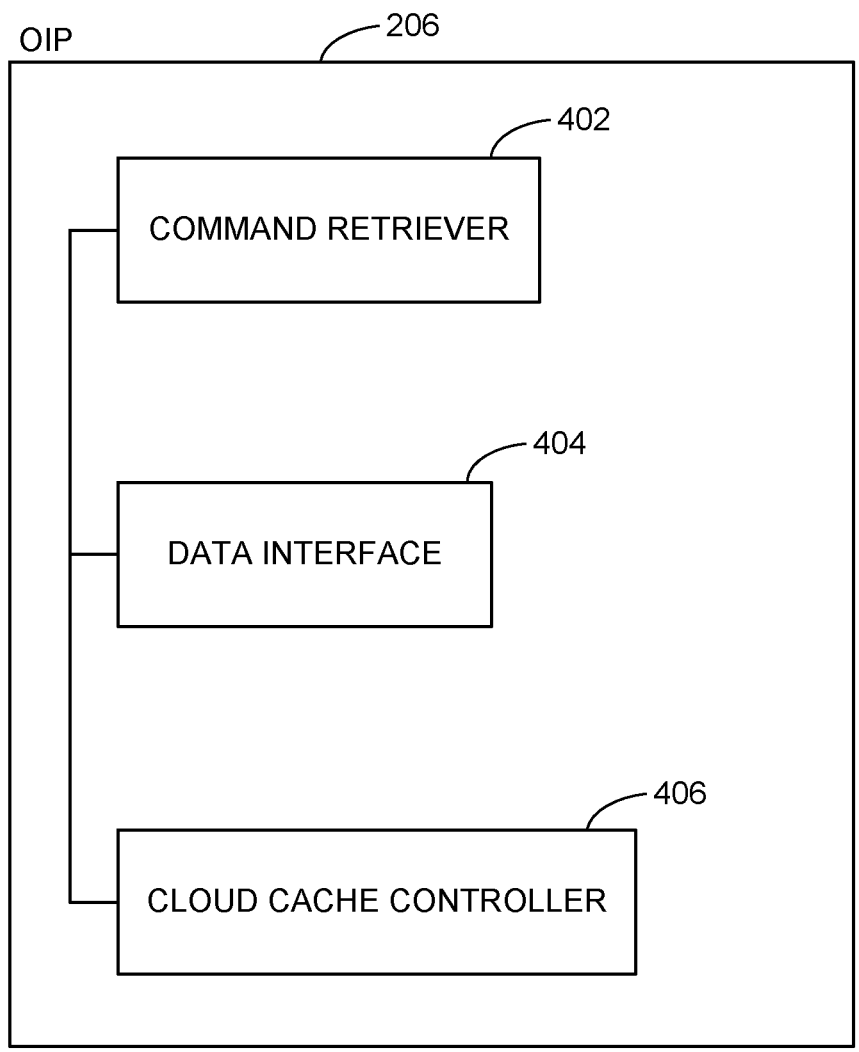
FIG. 4 is an illustration of an example implementation of the offline ID protector (OIP) of FIG. 2.

FIG. 4 illustrates additional detail of the example OIP 206 of FIG. 2. In the illustrated example of FIG. 4, the OIP 206 includes an example command retriever 402, an example data interface 404 and an example cloud cache controller 406. In operation, the example command retriever 402 determines whether it has received an update request or a verify request from the example spoof protector 208A. In the event of an update request, the example data interface 404 sends the package (e.g., a previous token and one or more artifacts retrieved from the example artifact storage 308) to the example BCTE 202. The example data interface 404 retrieves a new token from the BCTE 202 and forwards it to the example spoof protector 208A. On the other hand, in the event of a verify request from the example spoof protector 208A, the example data interface 404 sends the package to the example BCTE 202 and retrieves verification results (e.g., "pass," "fail").

The example command retriever 402 determines whether an indication of verification success (e.g., "pass") or an indication of verification failure (e.g., "fail") has occurred. In the event of a verification pass, the example cloud cache controller 406 stores the verified token in the example cloud cache server 210, and the example data interface 404 reports the indication of the verification success to the example spoof protector 208A and sends the token so that the example spoof protector 208A can store it as the current token in the example token storage 312. However, in the event of a verification failure, the example cloud cache controller 406 flags the token that was previously stored in the example cloud cache server 210 and/or removes it. In some examples, the OIP controller 314 removes unauthorized tokens from the example cloud storage device 210 and/or the example token storage 312). Additionally, the example data interface 404 reports the indication of failure to the example spoof protector 208A so that the token can be removed (e.g., removed from the example token storage 312).

Figure 5:
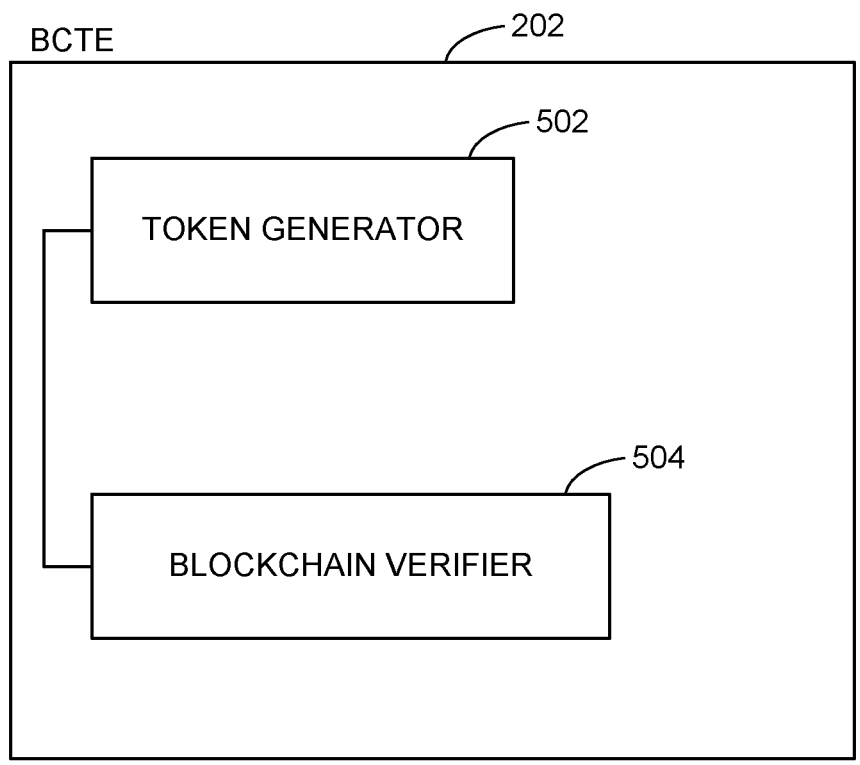
FIG. 5 is an illustration of an example implementation of the blockchain token engine (BCTE) of FIG. 2.

FIG. 5 illustrates additional detail of the example BCTE 202 of FIG. 2. In the illustrated example of FIG. 5, the BCTE 202 includes an example token generator 502 and an example blockchain verifier 504. In operation, the example BCTE 202 determines whether an update request or a verify request has been received. In the event of an update request, the example token generator 502 retrieves the data package, such as the example artifact data and previous token, as shown above in the illustrated example of Equation 1. The example token generator 502 generates a new token and the example BCTE 202 returns the same to the example spoof protector 208A (via the example OIP 206. In the event of a verify request, the example blockchain verifier 504 performs a blockchain verification based on the received artifact data, and the example BCTE 202 returns the results of the verification to the example spoof protector 208A. While the illustrated BCTE 202 of FIG. 5 includes the example token generator 502 and the example blockchain verifier 504, examples disclosed herein are not limited to the particular BCTE 202 of FIG. 5 and other blockchain systems may be applicable.

While an example manner of implementing the example spoofing prevention system 200 of FIG. 2 is illustrated in FIGS. 2-5, one or more of the elements, processes and/or devices illustrated in FIGS. 2-5 may be combined, divided, re-arranged, omitted, eliminated and/or implemented in any other way. Further, the example update engine 302, the example verify engine 304, the example artifact engine 306, the example blockchain status controller 310, the example OIP controller 314, the example cloud cache server 210, the example command retriever 402, the example data interface 404, the example cloud cache controller 406, the example token generator 502, the example blockchain verifier 504 and/or, more generally, the example spoof protector 208, the example OIP 206 and/or the example BCTE 202 of FIGS. 2-5 may be implemented by hardware, software, firmware and/or any combination of hardware, software and/or firmware. Thus, for example, any of the example update engine 302, the example verify engine 304, the example artifact engine 306, the example blockchain status controller 310, the example OIP controller 314, the example cloud cache server 210, the example command retriever 402, the example data interface 404, the example cloud cache controller 406, the example token generator 502, the example blockchain verifier 504 and/or, more generally, the example spoof protector 208, the example OIP 206 and/or the example BCTE 202 of FIGS. 2-5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example update engine 302, the example verify engine 304, the example artifact engine 306, the example blockchain status controller 310, the example OIP controller 314, the example cloud cache server 210, the example command retriever 402, the example data interface 404, the example cloud cache controller 406, the example token generator 502, the example blockchain verifier 504 and/or, more generally, the example spoof protector 208, the example OIP 206 and/or the example BCTE 202 of FIGS. 2-5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example spoofing prevention system 200 of FIGS. 2-5 may include one or more elements, processes and/or devices in addition to, or instead of, those illustrated in FIGS. 2-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example spoofing prevention system 200 of FIGS. 2-5 are shown in FIGS. 6-12. The machine readable instructions may be one or more executable programs or portion(s) of an executable program for execution by a computer processor such as the processor 1312 shown in the example processor platform 1300 discussed below in connection with FIG. 13. The program(s) may be embodied in software stored on a non-transitory computer readable storage medium such as a CD-ROM, a floppy disk, a hard drive, a DVD, a Blu-ray disk, or a memory associated with the processor 1312, but the entire program(s) and/or parts thereof could alternatively be executed by a device other than the processor 1312 and/or embodied in firmware or dedicated hardware. Further, although the example program(s) is/are described with reference to the flowcharts illustrated in FIGS. 6-12, many other methods of implementing the example spoofing prevention system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 6-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 6:
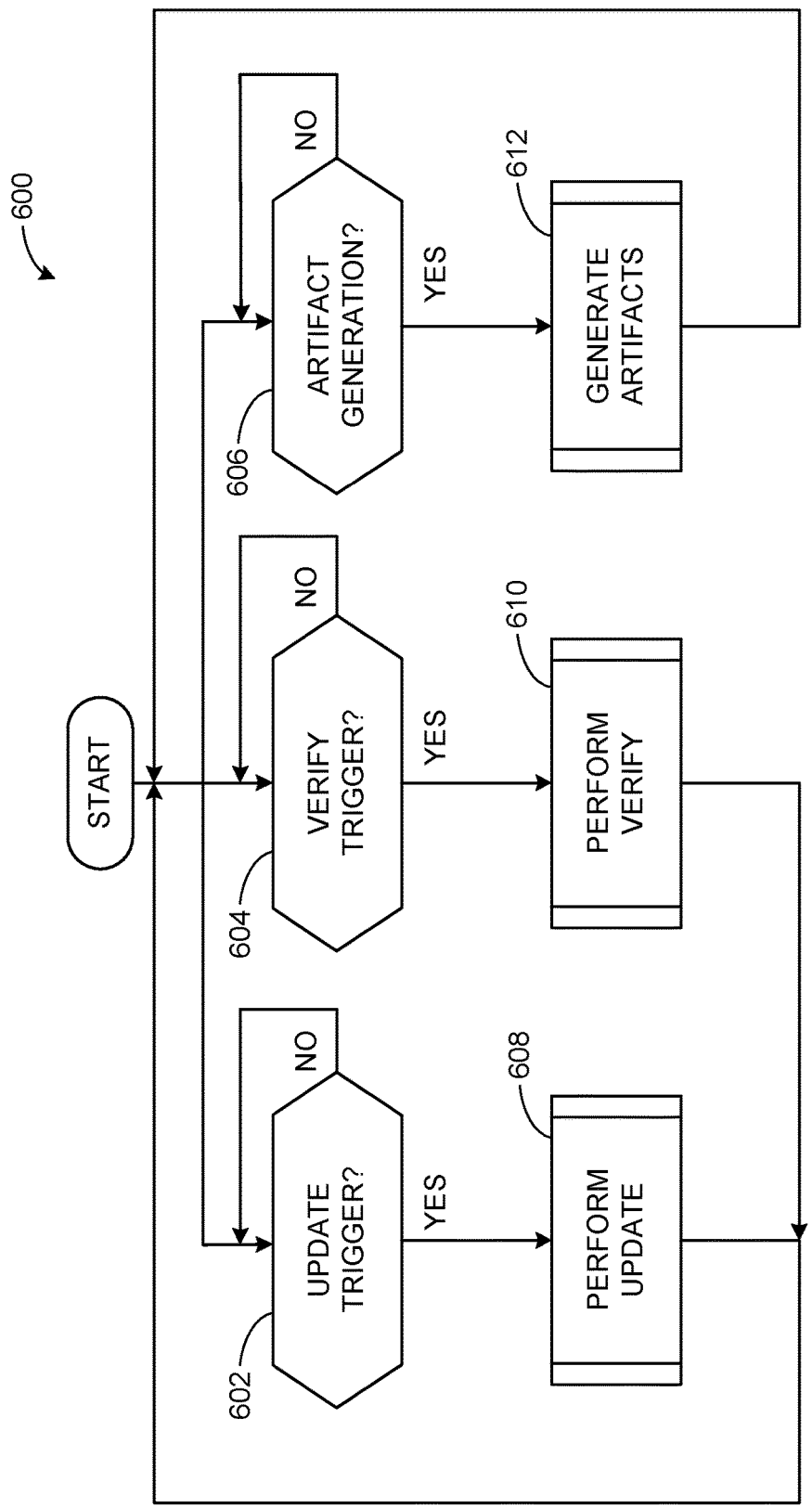
FIGS. 6-12 are flowcharts representative of example machine readable instructions which may be executed to implement the example blockchain system of FIG. 1, the example spoofing prevention system of FIG. 2, the example spoof protector of FIGS. 2 and 3, the example OIP of FIGS. 2 and 4, and the example BCTE of FIGS. 2 and 5 to reduce spoofing vulnerabilities.

The program 600 of FIG. 6 includes block 602, in which the example update engine 302 determines whether an update trigger has occurred. However, the example spoof protector 208A operates with additional tasks in parallel, one of which is the example verify engine 304 to determine whether a verify trigger has occurred (block 604), and another task in which the example artifact engine 306 is to determine whether an artifact generation task trigger has occurred (block 606). In the event the example update engine 302 detects an update trigger (block 602), then the example update engine 302 invokes a procedure to perform an update (block 608), which causes a new token to be generated. In the event the example verify engine 304 detects a verify trigger (block 604), then the example verify engine 304 invokes a procedure to perform a verification (block 610), which determines whether an already-existing token is unaltered and/or otherwise safe. In the event the example artifact engine 306 detects an artifact generation trigger (block 606), then the example artifact engine 306 invokes a procedure to generate one or more artifacts (block 612).

Figure 7:
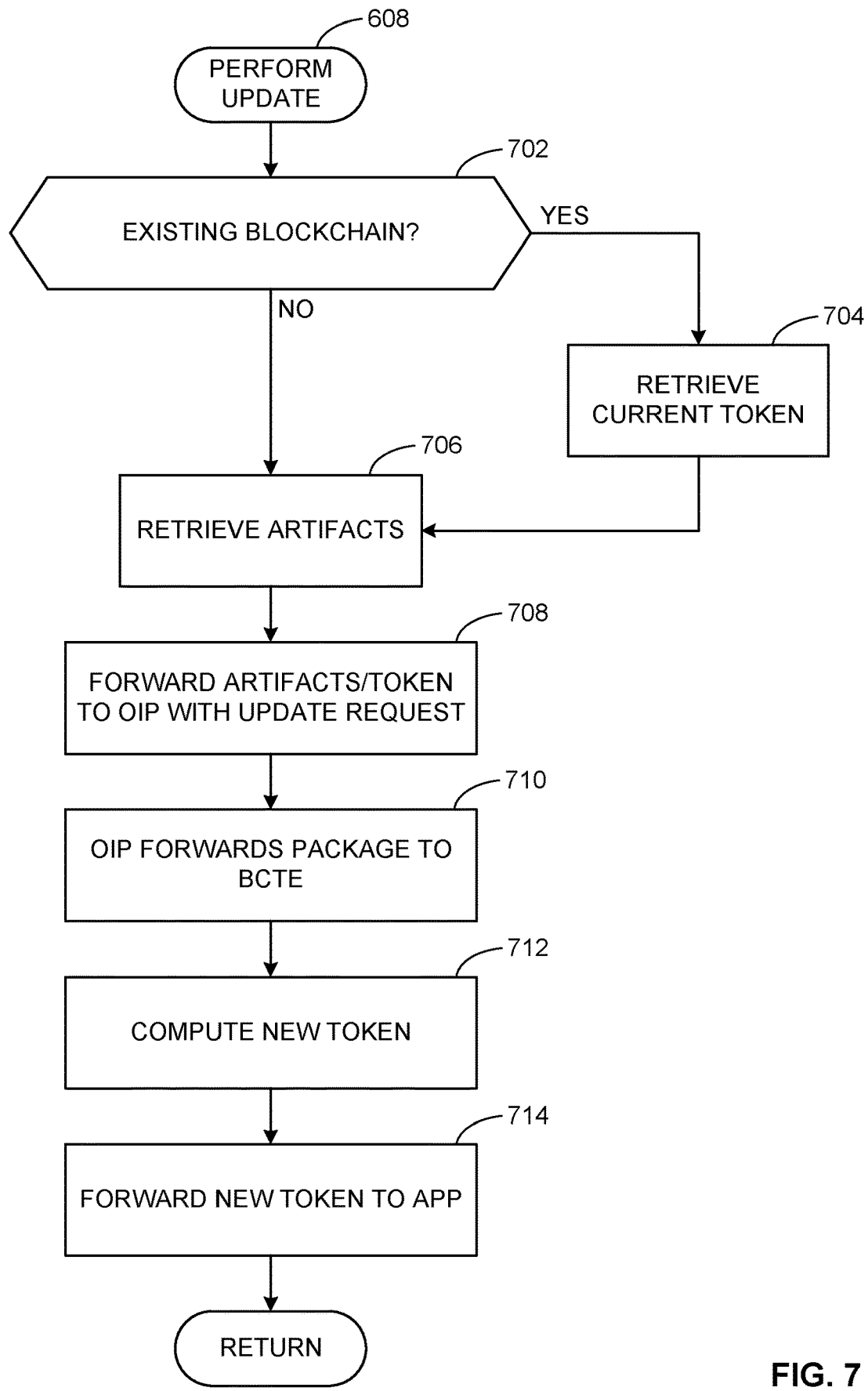

FIG. 7 includes additional detail of block 608 to perform an update. As described above, the example spoofing prevention system 200 generates tokens to build a blockchain, which reflects a history of a corresponding spoof protector 208A and its associated user/user device. The example spoof protector 208A determines a frequency for which to generate new tokens (e.g., via an update request) to reduce a possibility that a relatively older token has not been acquired by a hacker in an effort to access digital services and/or systems. As each additional token is generated, the corresponding length of the blockchain grows, thereby preserving a nested history of prior tokens and time-stamped artifacts. Because blockchain systems employ many computing devices with each computing device having a copy of the blockchain, any attempts at improper modification of one of the blockchains is detected by one of the participating computing devices. Such attempts result in the attacked blockchain having the suspicious entry (e.g., a suspicious token and associated artifact(s)) purged, thereby preserving the integrity of the blockchain.

In the illustrated example of FIG. 7, the example blockchain status controller 310 determines whether the user and/or user device is associated with an existing blockchain (block 702). If so, the example blockchain status controller 310 retrieves the current token from the example token storage 312 (block 704). However, in the event that the update trigger detected by the example update engine 302 occurred for the first time, then no current or prior token is available, and a new blockchain will begin at the time of this first update trigger occurring (block 602). The example artifact engine 306 retrieves one or more artifacts from the example artifact storage 308 (block 706). As described above, the example artifact engine 306 may perform a periodic, aperiodic, scheduled and/or manual frequency of obtaining candidate artifacts to be stored in the example artifact storage 308.

The example OIP controller 314 forwards the selected artifacts and, if available, previous token, to the example OIP 206 as a package of data accompanied with an update request/command (block 708), which causes the example OIP 206 to further propagate the package to the example BCTE 202 (block 710). The example BCTE 202 computes and/or otherwise generates a new token (block 712) in a manner consistent with example Equation 1, and forwards the new token to the example spoof protector 208A (block 714). Additionally, when the example BCTE 202 computes and/or otherwise generates the new token (block 712), a new entry is added to the blockchain, which includes the time-stamped artifacts. Control then returns to the example program 600 of FIG. 6.

Figure 8:
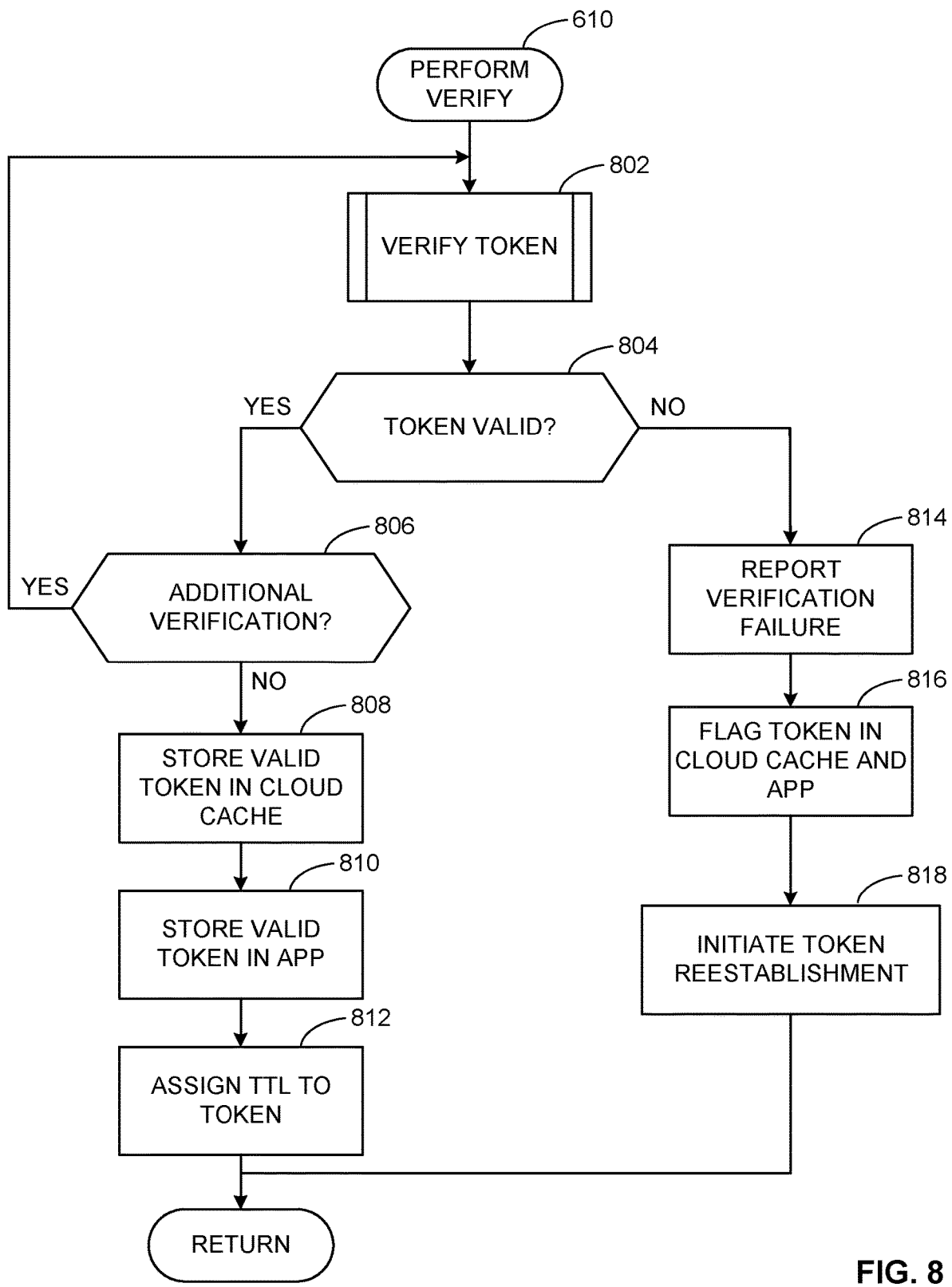

FIG. 8 includes additional detail of block 610 to perform a token verification. As described above, the example spoofing prevention system 200 considers the possibility that a token can be acquired by a hacker and fraudulently used in an effort to authenticate a user ID during digital communications. As such, the example spoofing prevention system 200 invokes a verification procedure on a periodic, aperiodic, scheduled and/or manual basis to determine whether a particular token is safe. In some examples, token verification efforts may originate from a third party network entity, such as an online bank that seeks to ensure a user identification is valid before allowing account access. In still other examples, two or more iterations of verification procedures are invoked to reduce the possibility that a hacker has at least one token and associated artifact data associated therewith. Stated differently, in the event two verification procedures are invoked, the possibility that the hacker would have a full historical account of prior artifacts and associated timestamps is believed to be impossible.

In the illustrated example of FIG. 8, the example verify engine 304 initiates a token verification process (block 802) and evaluates the results to distinguish between valid tokens and invalid tokens (block 804). In the event the token is deemed valid (block 804), the example verify engine 304 determines whether an additional verification process is to be repeated (block 806). In some examples, the verify engine 304 selects alternate artifacts in a random (e.g., pseudo-random) manner to further reduce the possibility that the hacker is able to guess such alternate artifacts and their associated timestamps of creation. If additional verification is to occur (block 806), such as at the request of an online entity (e.g., a social media service, a banking service, etc.), then control returns to block 802. In the event no additional verification is to occur (block 806), then the OIP controller 314 instructs the example OIP 206 to store the verified token in the example cloud cache server 210 (block 808). The example blockchain status controller 310 also stores the valid token in the example token storage 312 (block 810), and is thereafter referred to as the current token. The example spoof protector 208A assigns a time to live (TTL) to the current token (block 812).

In the event the token is not valid (block 804), then the example verify engine 304 reports a verification failure to the user and/or user device (block 814). The example verify engine 304 flags the token as suspicious in the example cloud cache server 210 and the token storage 312 (block 816). Because the token is deemed untrustworthy, the example update engine 302 initiates a process to generate a new token with an update request (block 818), as described above. In some examples where a token is believed to have been stolen and/or otherwise improperly obtained (e.g., by a hacker), the example update engine 302 initiates the token reestablishment process with a flag to cause two or more instances of verification after the new token is generated (as described in connection with block 806 above).

Figure 9:
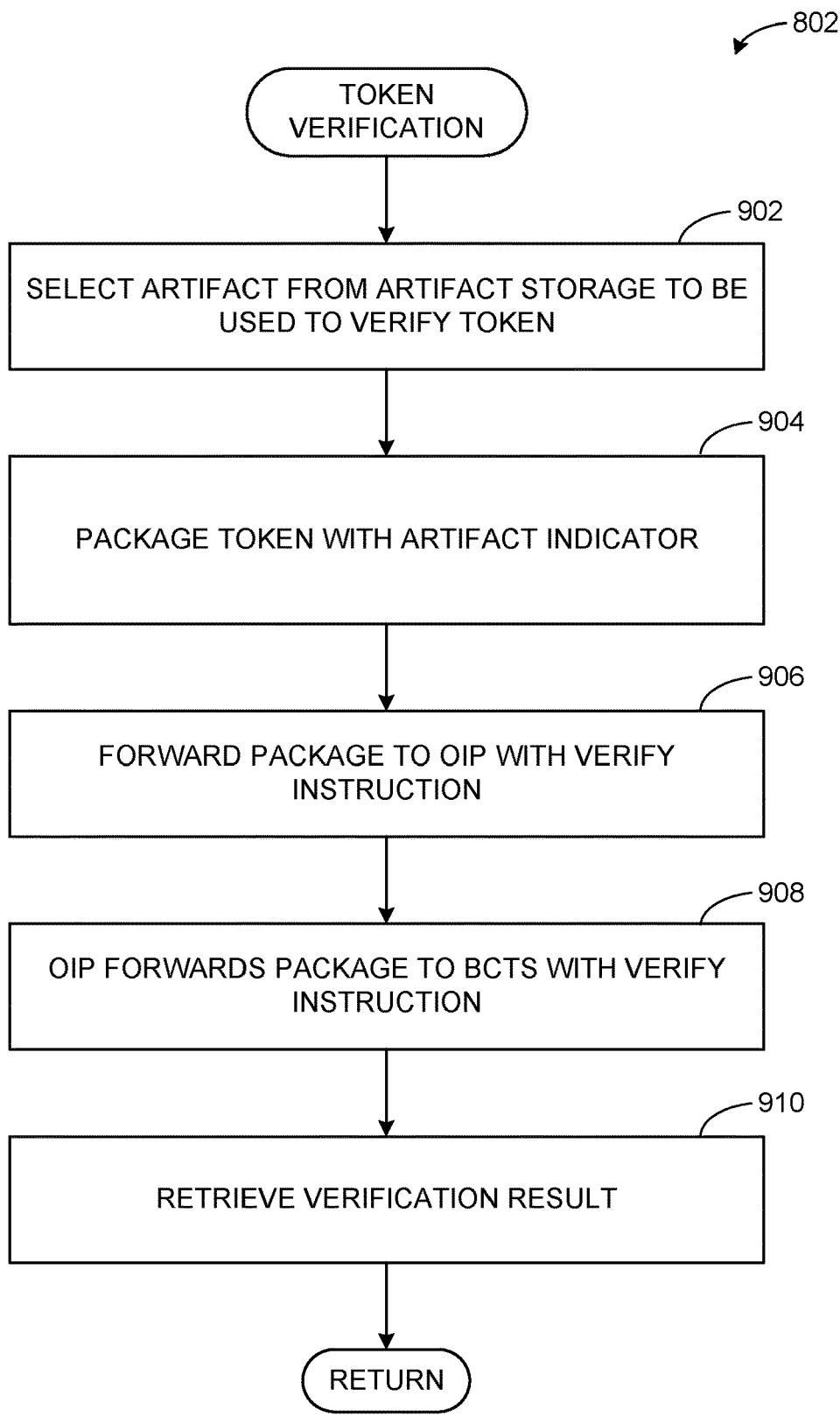

FIG. 9 includes additional detail of block 802 to perform token verification. In the illustrated example of FIG. 9, the example artifact engine 306 selects one or more artifacts from the example artifact storage 308 to be used to verify the token (block 902). As described above, the artifacts may be selected in a random (e.g., pseudo-random) manner to reduce the possibility of the hacker guessing particular artifacts and associated timestamps. The example artifact engine 306 packages the selected artifact(s) into a format acceptable to the example OIP 206 (block 904), and the example OIP controller 314 forwards the package to the OIP 206 (block 906). In particular, because the example OIP controller 314 forwards the package with a verify instruction/command (block 906), the OIP controller 314 causes the OIP 206 to request verification of the token by the example BCTE 202 (block 908). After the BCTE 202 performs the verification process, the success indication or failure indication is retrieved by the example OIP 206 (block 910) and control returns to block 804 of FIG. 8.

Figure 10:
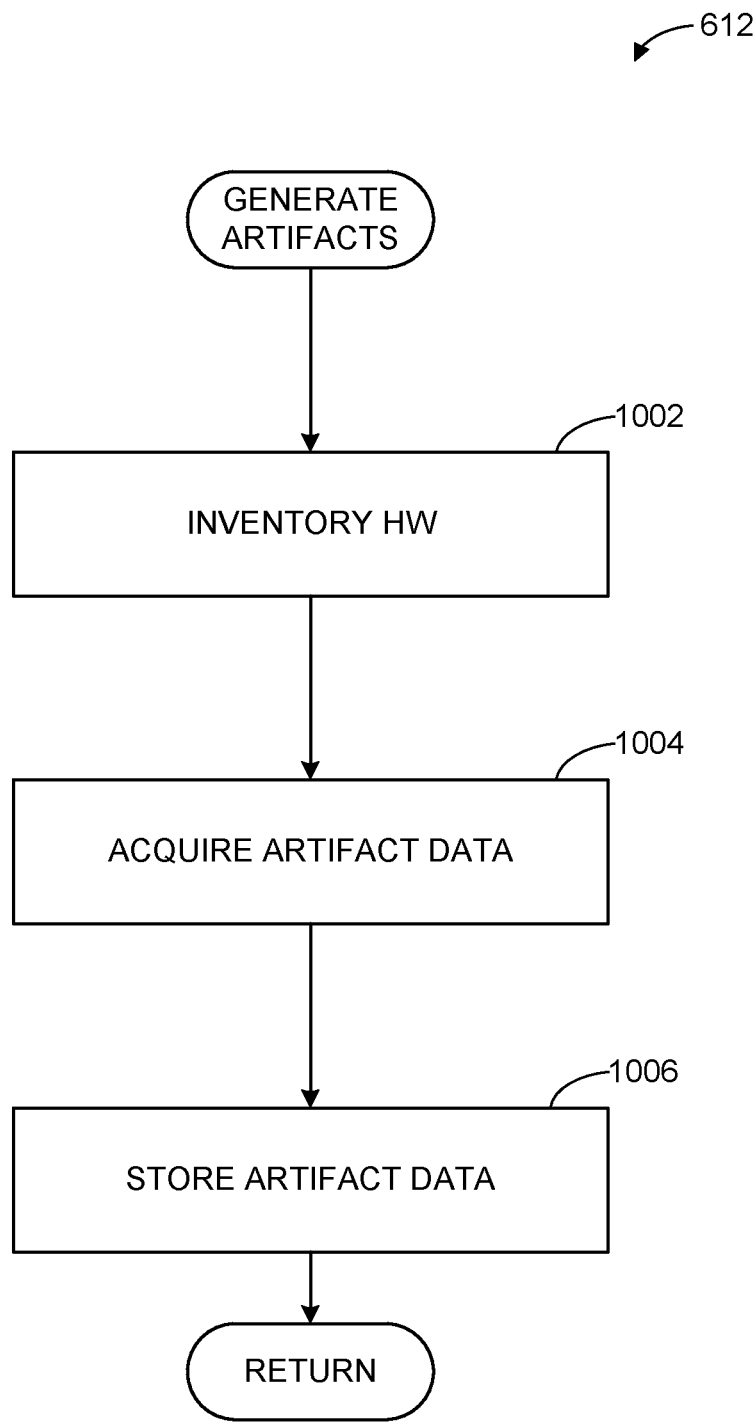

FIG. 10 includes additional detail of block 612 to perform artifact generation. In the illustrated example of FIG. 10, the example artifact engine 306 is invoked on a periodic, aperiodic, scheduled and/or manual basis to cultivate a variety of artifacts that can be used for blockchain growth. Such artifacts do not necessarily need to be related to characteristics of the user (e.g., a password, an eye color, a name, etc.), and such artifacts do not necessarily need to be related to characteristics of the user device (e.g., an IMEI number, a MAC address, an IP address, etc.). Instead, artifact cultivation/generation includes discrete pieces of information that, when combined with a timestamp of their creation, establish a unique history for the user and/or user device. Such unique history of artifacts may be stored on the device, such as within the example artifact storage 308. While a hacker might be able to acquire/steal one instance of an artifact package, the likelihood that the hacker has a full history of all artifacts and associated timestamps is very low, thereby reducing chances that a spoofing attack will be successful. Additionally, because the example artifact storage 308 may be encrypted, theft of the data contained therein is unlikely to be used by a hacker when attempting to provide proper combinations of (a) artifacts and (b) associated timestamps during a verification operation(s).

In the illustrated example of FIG. 10, the example artifact engine 306 performs an inventory of device hardware/components (block 1002). For example, a device may begin blockchain development with a first set of components, in which some of those components are capable of providing artifacts (e.g., sensor data, device data, etc.). However, in the event the device has expansion capabilities, the example artifact engine 306 can detect newly added components to take advantage of alternate artifact data that such new components can generate. The example artifact engine 306 acquires artifact data from the available components (block 1004), and stores such data in the example artifact storage with a timestamp (block 1006). Control then returns to the program of FIG. 6.

Figure 11:
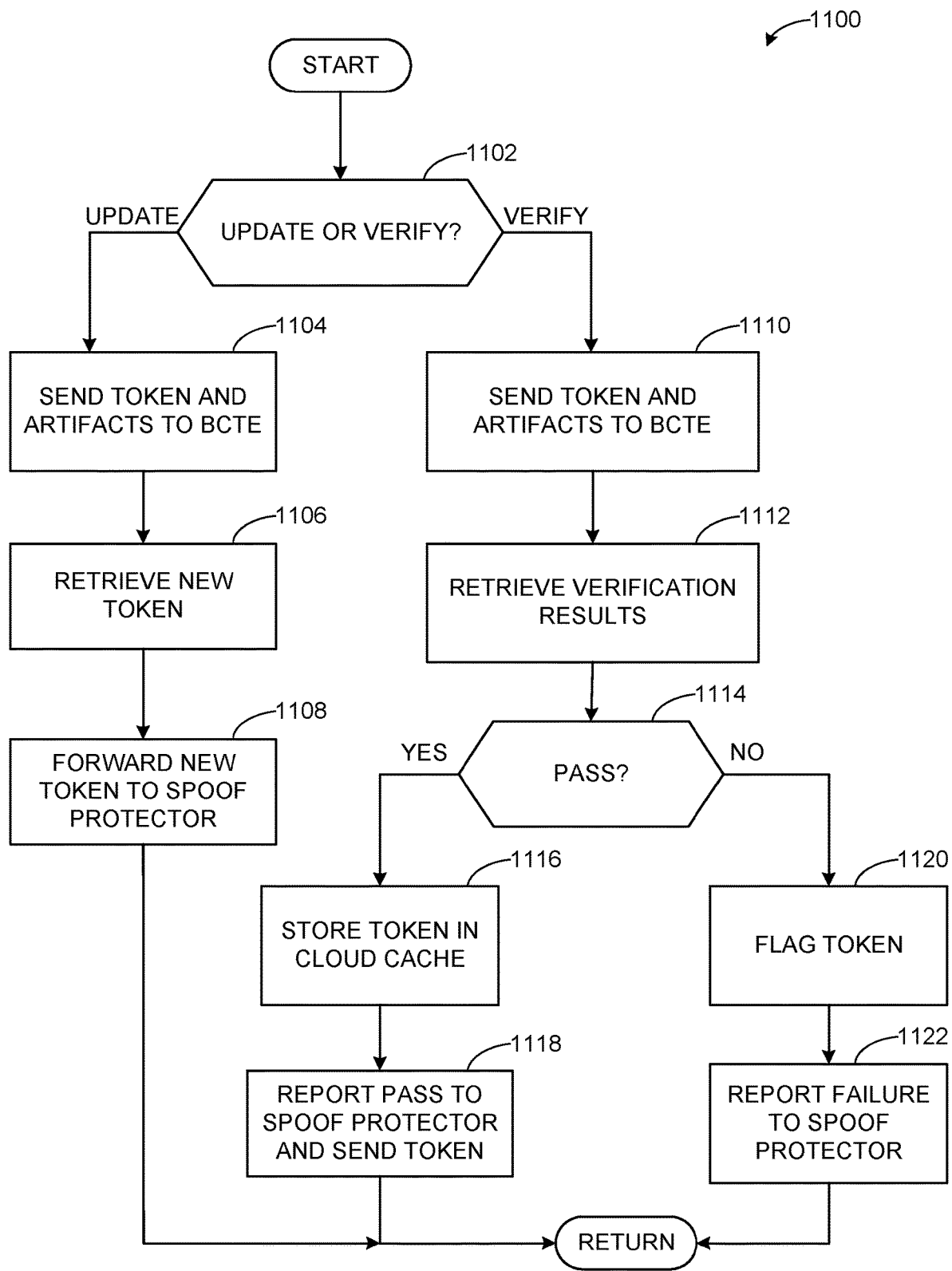

FIG. 11 is an implementation of example machine readable instructions 1100 associated with the example OIP 206 of FIGS. 2-4. In the illustrated example of FIG. 11, the example command retriever 402 determines whether the OIP 206 has received an update request or a verify request (block 1102). In the event of an update request, the example data interface 404 sends the package (e.g., a received token and artifacts) to the example BCTE 202 (block 1104). After the example BCTE 202 has generated a new token, the example data interface 404 retrieves the new token (block 1106) and forwards the same to the example spoof protector 208A (block 1108). On the other hand, in the event the command retriever 402 determines that the OIP 206 has received a verify request (block 1102), then the example data interface 404 sends the package (e.g., a received token and artifacts) to the example BCTE 202 (block 1110). After the example BCTE 202 has generated a result of the verify check (e.g., a "pass" indicator, a "fail" indicator), the example data interface 404 retrieves those results (block 1112) and the example command retriever 402 determines whether a "pass" indicator or a "fail" indicator was received (block 1114).

In the event the example command retriever 402 identifies an indication that the token passed the verification test/check (block 1114), the example cloud cache controller 406 stores the token in the example cloud cache server 210 (block 1116). The example data interface 404 reports the indication of the verification pass and sends the verified token to the example spoof protector 208A (block 1118). However, in the event the example command retriever 402 identifies an indication that the token failed the verification test/check (block 1114), then the example cloud cache controller 406 flags the token as suspicious (block 1120), and the example data interface 404 reports the failure to the example spoof protector 208A (block 1122).

Figure 12:
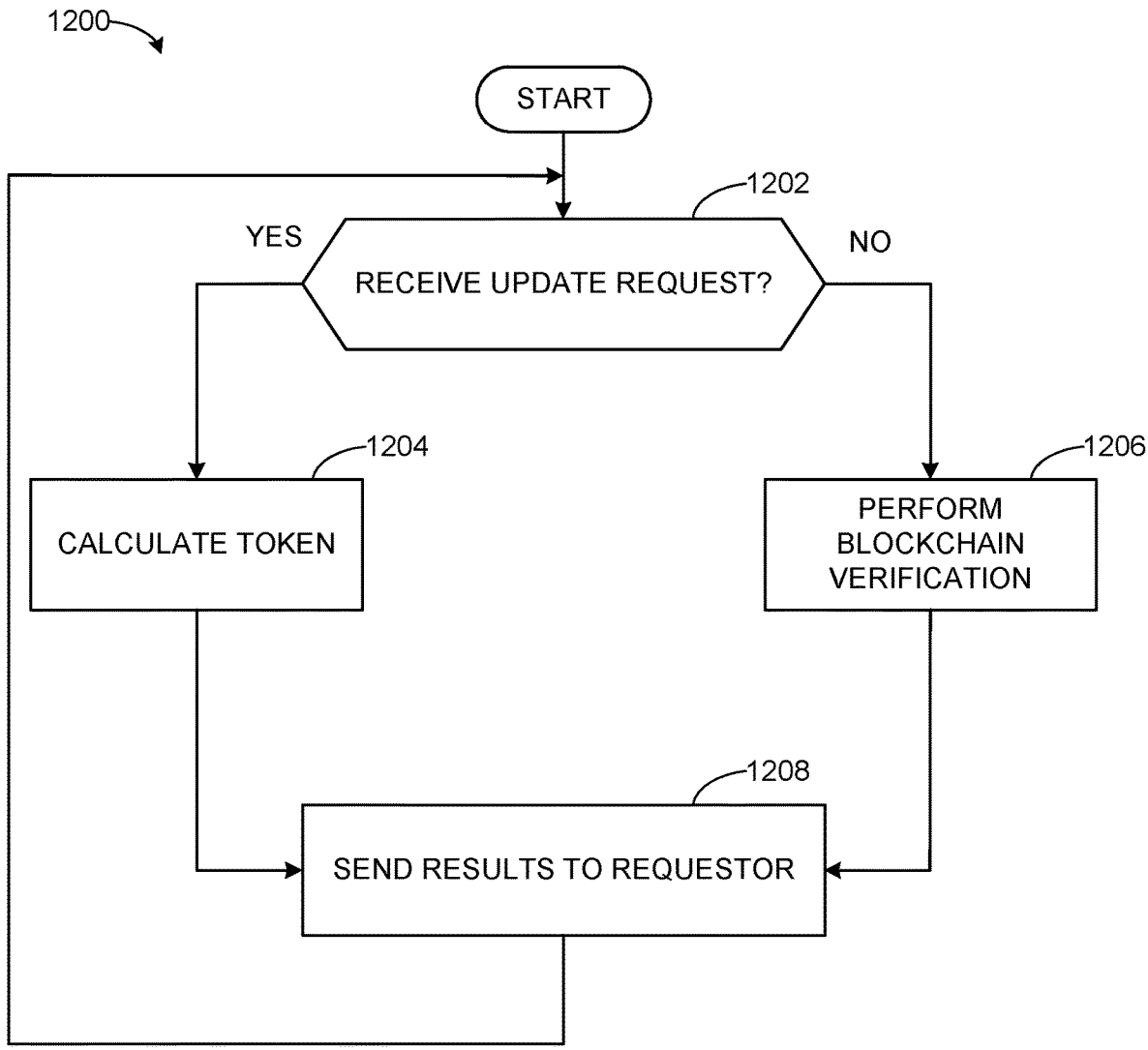

FIG. 12 is an implementation of example machine readable instructions 1200 associated with the example BCTE 202 of FIGS. 2-4. In the illustrated example of FIG. 12, the example BCTE 202 determines whether the BCTE 202 has received an update request or a verify request (block 1202). In the event of an update request, the example token generator 502 calculates and/or otherwise generates a token based on the received package (block 1204). In some examples, the new token is generated in a manner consistent with example Equation 1. In the event of a verify request (block 1202), the example blockchain verifier 504 performs a token verification using the received package data and one or more entries of the blockchain (e.g., see example tokens 112, 114 of the example blockchain copy 110A of FIG. 1) (block 1206). Results from update requests and verify requests are forwarded by the example BCTE 202 to requesting entities (block 1208), such as the example OIP 206 and the example spoof protector 208A.

Figure 13:
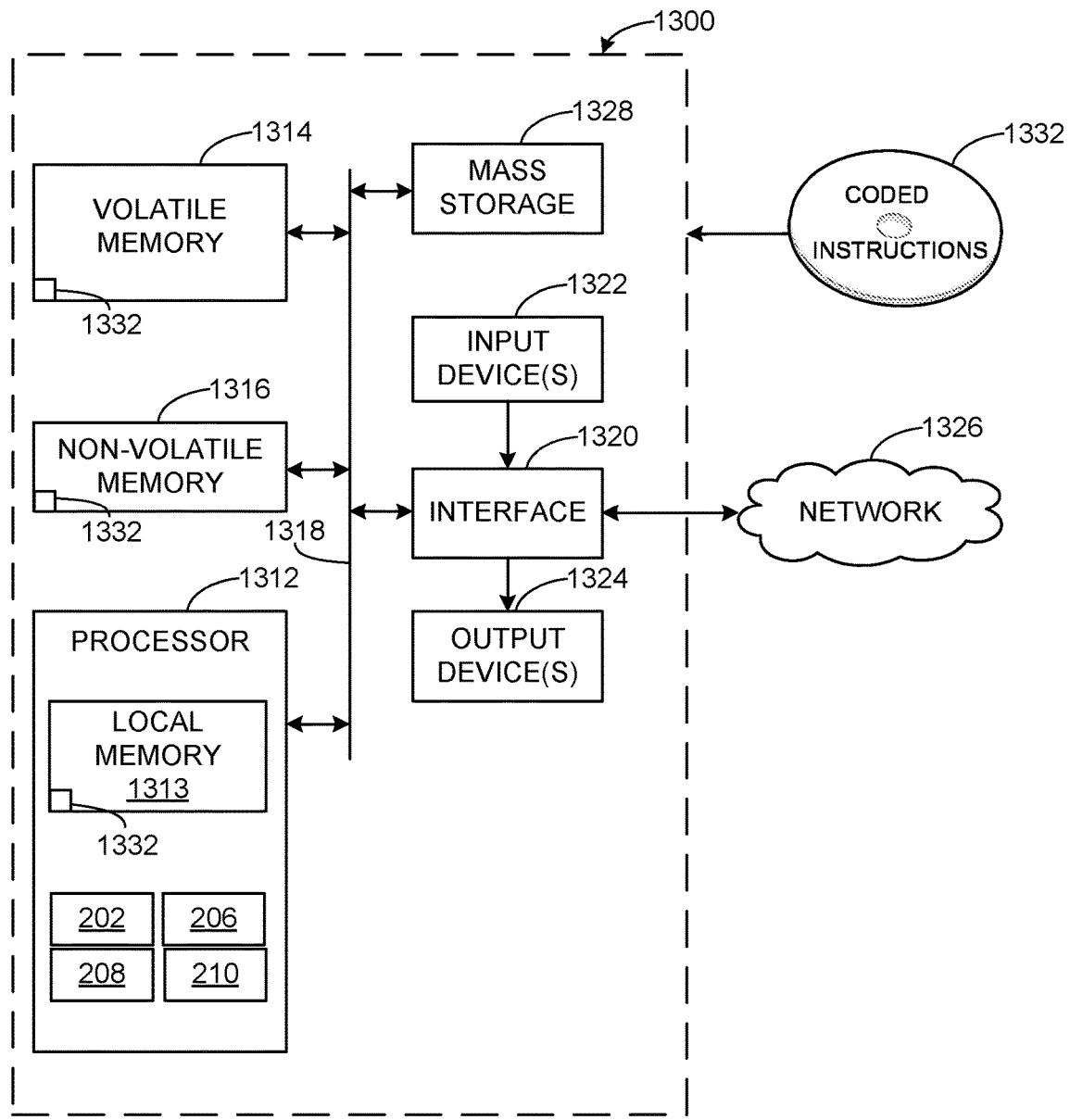
FIG. 13 is a block diagram of an example processing platform structured to execute the instructions of FIGS. 6-12 to implement the example blockchain system of FIG. 1, the example spoofing prevention system of FIG. 2, the example spoof protector of FIGS. 2 and 3, the example OIP of FIGS. 2 and 4, and the example BCTE of FIGS. 2 and 5.

FIG. 13 is a block diagram of an example processor platform 1300 structured to execute the instructions of FIGS. 6-12 to implement the example spoofing prevention system 200 of FIGS. 2-5. The processor platform 1300 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example update engine 302, the example verify engine 304, the example artifact engine 306, the example blockchain status checker 410, the example OIP controller 314 and, more generally, the example spoof protector 208. The processor also implements the example command retriever 402, the example data interface 404, the example cloud cache controller 406 and, more generally, the example OIP 206. The processor also implements the example token generator 502, the example blockchain verifier 504 and, more generally, the example BCTE 202. The processor also implements the example cloud cache server 210.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 6-12 may be stored in the mass storage device 1328, in the volatile memory 1314, in the non-volatile memory 1316, and/or on a removable non-transitory computer readable storage medium such as a CD or DVD.

Example methods, apparatus, systems, and articles of manufacture to reduce spoofing vulnerabilities are disclosed herein. Further examples and combinations thereof include the following:

Example 1 includes an apparatus to verify token integrity for a computing device, the apparatus comprising an artifact engine to store first artifact data with a first timestamp in a device artifact storage, and store second artifact data with a second timestamp in the device artifact storage, an offchain identification protector (OIP) controller to generate a first token based on the first artifact data and the first timestamp, the first token to establish a first entry in a blockchain at a first time, and generate a second token based on the second artifact data, the second timestamp, and the first token, the second token to establish a second entry in the blockchain at a second time after the first time, and a verify engine to select the first or the second artifact from the device artifact storage, and search for a match of the selected first or second artifact in the blockchain to verify an integrity of the second token at a third time.

Example 2 includes the apparatus as defined in example 1, wherein the verify engine is to, in response to a successful match of the selected first or second artifact in the blockchain, designate the second token as valid.

Example 3 includes the apparatus as defined in example 2, wherein the OIP controller is to store the valid second token in a cloud storage device.

Example 4 includes the apparatus as defined in example 3, wherein the OIP controller is to provide access information corresponding to the cloud storage device in response to an authentication request to the computing device.

Example 5 includes the apparatus as defined in example 4, wherein the authentication request is associated with at least one of an online financial entity, a social media entity, or an e-mail entity.

Example 6 includes the apparatus as defined in example 2, wherein the verify engine is to repeat the verification of the integrity of the second token using an alternate one of the selected first or second artifacts when searching for the match in the blockchain.

Example 7 includes the apparatus as defined in example 1, wherein the verify engine is to, in response to a failed match of the selected first or second artifact in the blockchain, designate the second token as unverified.

Example 8 includes the apparatus as defined in example 7, wherein the OIP controller is to remove the second token from a cloud storage device to prevent unauthorized access to digital services.

Example 9 includes the apparatus as defined in example 7, further including an update engine to invoke generation of a third token to replace the unverified second token, the third token based on third artifact data.

Example 10 includes the apparatus as defined in example 1, wherein the verify engine is to confirm the match when a timestamp associated with the second token at the third time matches the second timestamp in the second entry of the blockchain.

Example 11 includes the apparatus as defined in example 1, wherein the verify engine is to apply at least one of a random or pseudo-random selection of the first or the second artifact from the device artifact storage.

Example 12 includes a non-transitory computer readable storage medium comprising instructions that, when executed, cause a machine to at least store first artifact data with a first timestamp in a device artifact storage, store second artifact data with a second timestamp in the device artifact storage, generate a first token based on the first artifact data and the first timestamp, the first token to establish a first entry in a blockchain at a first time, generate a second token based on the second artifact data, the second timestamp, and the first token, the second token to establish a second entry in the blockchain at a second time after the first time, select the first or the second artifact from the device artifact storage, and search for a match of the selected first or second artifact in the blockchain to verify an integrity of the second token at a third time.

Example 13 includes the computer readable storage medium as defined in example 12, wherein the instructions, when executed, cause the machine to, in response to a successful match of the selected first or second artifact in the blockchain, designate the second token as valid.

Example 14 includes the computer readable storage medium as defined in example 13, wherein the instructions, when executed, cause the machine to store the valid second token in a cloud storage device.

Example 15 includes the computer readable storage medium as defined in example 14, wherein the instructions, when executed, cause the machine to provide access information corresponding to the cloud storage device in response to an authentication request to the computing device.

Example 16 includes the computer readable storage medium as defined in example 13, wherein the instructions, when executed, cause the machine to repeat the verification of the integrity of the second token using an alternate one of the selected first or second artifacts when searching for the match in the blockchain.

Example 17 includes the computer readable storage medium as defined in example 12, wherein the instructions, when executed, cause the machine to, in response to a failed match of the selected first or second artifact in the blockchain, designate the second token as unverified.

Example 18 includes the computer readable storage medium as defined in example 17, wherein the instructions, when executed, cause the machine to remove the second token from a cloud storage device to prevent unauthorized access to digital services.

Example 19 includes the computer readable storage medium as defined in example 17, wherein the instructions, when executed, cause the machine to invoke generation of a third token to replace the unverified second token, the third token based on third artifact data.

Example 20 includes the computer readable storage medium as defined in example 12, wherein the instructions, when executed, cause the machine to confirm the match when a timestamp associated with the second token at the third time matches the second timestamp in the second entry of the blockchain.

Example 21 includes the computer readable storage medium as defined in example 12, wherein the instructions, when executed, cause the machine to apply at least one of a random or pseudo-random selection of the first or the second artifact from the device artifact storage.

Example 22 includes a method to verify token integrity for a computing device, the method comprising storing first artifact data with a first timestamp in a device artifact storage, storing second artifact data with a second timestamp in the device artifact storage, generating a first token based on the first artifact data and the first timestamp, the first token to establish a first entry in a blockchain at a first time, generating a second token based on the second artifact data, the second timestamp, and the first token, the second token to establish a second entry in the blockchain at a second time after the first time, selecting the first or the second artifact from the device artifact storage, and searching for a match of the selected first or second artifact in the blockchain to verify an integrity of the second token at a third time.

Example 23 includes the method as defined in example 22, further including, in response to a successful match of the selected first or second artifact in the blockchain, designating the second token as valid.

Example 24 includes the method as defined in example 23, further including storing the valid second token in a cloud storage device.

Example 25 includes the method as defined in example 24, further including providing access information corresponding to the cloud storage device in response to an authentication request to the computing device.

Example 26 includes the method as defined in example 23, further including repeating the verification of the integrity of the second token using an alternate one of the selected first or second artifacts when searching for the match in the blockchain.

Example 27 includes the method as defined in example 22, further including, in response to a failed match of the selected first or second artifact in the blockchain, designating the second token as unverified.

Example 28 includes the method as defined in example 27, further including removing the second token from a cloud storage device to prevent unauthorized access to digital services.

Example 29 includes the method as defined in example 27, further including invoking generation of a third token to replace the unverified second token, the third token based on third artifact data.

Example 30 includes the method as defined in example 22, further including confirming the match when a timestamp associated with the second token at the third time matches the second timestamp in the second entry of the blockchain.

Example 31 includes the method as defined in example 22, further including applying at least one of a random or pseudo-random selection of the first or the second artifact from the device artifact storage.

From the foregoing, it will be appreciated that example methods, systems, apparatus and articles of manufacture have been disclosed that reduce the likelihood that a hacker can successfully spoof an identity of a user and/or a user device. Examples disclosed herein overcome the inherent limitations of using credentials (e.g., mere knowledge-based credentials) for digital access that can be observed, copied and/or otherwise memorized by hackers. However, because examples disclosed herein provide a historical suite of artifacts associated with the user identity and/or user device, the ability for a hacker to successfully spoof a token is substantially reduced when such challenges for token verification can utilize random (e.g., pseudo-random) artifacts from different time-periods within the blockchain history.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to verify token integrity, the apparatus comprising:
artifact engine circuitry to:
store first artifact data with a first timestamp in a device artifact storage of the apparatus; and store second artifact data with a second timestamp in the device artifact storage;
spoof protector circuitry to monitor a cadence of token generation requests occurring on a remote computing device and sent to an offchain identification protector (OIP);
offchain identification protector (OIP) controller circuitry to:
    control generation of a first token based on the first artifact data and the first timestamp, the first token generated at a blockchain service and stored in a token storage of the apparatus, the first token to establish a first entry in a blockchain of the blockchain service at a first time; and
    in response to the cadence of token generation requests satisfying a threshold value, control generation of a second token based on the second artifact data, the second timestamp, and the first token, the second token generated at the blockchain service and stored in the token storage, the second token to establish a second entry in the blockchain at a second time after the first time, the second artifact data retrieved from within the device artifact storage of the apparatus and the first token retrieved from within the token storage of the apparatus; and
verify engine circuitry to:
    select the first or the second artifact data from the device artifact storage; and
    send the selected first or second artifact data to the blockchain service via the OIP in order to search for a match of the selected first or second artifact data in the blockchain to verify an integrity of the second token at a third time.

2. The apparatus as defined in claim 1, wherein the verify engine circuitry is to, in response to a successful match of the selected first or second artifact data in the blockchain, designate the second token as valid.

3. The apparatus as defined in claim 2, wherein the OIP controller circuitry is to store the valid second token in the token storage.

4. The apparatus as defined in claim 3, wherein the OIP controller circuitry is to provide access information corresponding to the remote computing device in response to an authentication request to the apparatus.

5. The apparatus as defined in claim 1, wherein the verify engine circuitry is to, in response to a failed match of the selected first or second artifact data in the blockchain, designate the second token as unverified.

6. The apparatus as defined in claim 5, wherein the OIP controller circuitry is to remove the second token from the token storage of the apparatus to prevent unauthorized access to digital services.

7. The apparatus as defined in claim 5, further including update engine circuitry to invoke generation of a third token to replace the unverified second token, the third token based on third artifact data.

8. The apparatus as defined in claim 1, wherein the verify engine circuitry is to confirm the match when a timestamp associated with the second token at the third time matches the second timestamp in the second entry of the blockchain.

9. A non-transitory computer readable storage medium comprising instructions that, when executed, cause a machine to at least:
    store first artifact data with a first timestamp in a device artifact storage of an apparatus;
    store second artifact data with a second timestamp in the device artifact storage;
    monitor a cadence of token generation requests occurring on a remote computing device and sent to an offchain identification protector (OIP);
    control generation of a first token based on the first artifact data and the first timestamp, the first token generated at a blockchain service and stored in a token storage of the apparatus, the first token to establish a first entry in a blockchain of the blockchain service at a first time;
    in response to the cadence of token generation requests satisfying a threshold value, control generation of a second token based on the second artifact data, the second timestamp, and the first token, the second token generated at the blockchain service and stored in the token storage, the second token to establish a second entry in the blockchain at a second time after the first time, the second artifact data retrieved from within the device artifact storage of the apparatus and the first token retrieved from within the token storage of the apparatus;
    select the first or the second artifact data from the device artifact storage; and
    send the selected first or second artifact data to the blockchain service via the OIP in order to search for a match of the selected first or second artifact data in the blockchain to verify an integrity of the second token at a third time.

10. The non-transitory computer readable storage medium as defined in claim 9, wherein the instructions, when executed, cause the machine to, in response to a successful match of the selected first or second artifact data in the blockchain, designate the second token as valid.

11. The non-transitory computer readable storage medium as defined in claim 10, wherein the instructions, when executed, cause the machine to store the valid second token in the token storage.

12. The non-transitory computer readable storage medium as defined in claim 11, wherein the instructions, when executed, cause the machine to provide access information corresponding to the remote computing device in response to an authentication request to the apparatus.

13. The non-transitory computer readable storage medium as defined in claim 10, wherein the instructions, when executed, cause the machine to repeat verification of the integrity of the second token using an alternate one of the selected first or second artifact data when searching for the match in the blockchain.

14. The non-transitory computer readable storage medium as defined in claim 9, wherein the instructions, when executed, cause the machine to confirm the match when a timestamp associated with the second token at the third time matches the second timestamp in the second entry of the blockchain.

15. A method to verify token integrity, the method comprising:
    storing first artifact data with a first timestamp in a device artifact storage of an apparatus;
    storing second artifact data with a second timestamp in the device artifact storage;
    monitoring a cadence of token generation requests occurring on a remote computing device and sent to an offchain identification protector (OIP);
    controlling generation of a first token based on the first artifact data and the first timestamp, the first token generated at a blockchain service and stored in a token storage of the apparatus, the first token to establish a first entry in a blockchain of the blockchain service at a first time;

in response to the cadence of token generation requests satisfying a threshold value, controlling generation of a second token based on the second artifact data, the second timestamp, and the first token, the second token generated at the blockchain service and stored in the token storage, the second token to establish a second entry in the blockchain at a second time after the first time, the second artifact data retrieved from within the device artifact storage of the apparatus and the first token retrieved from within the token storage of the apparatus;

selecting the first or the second artifact data from the device artifact storage; and sending the selected first or second artifact data to the blockchain service via the OIP in order to search for a match of the selected first or second artifact data in the blockchain to verify an integrity of the second token at a third time.

16. The method as defined in claim 15, further including, in response to a successful match of the selected first or second artifact data in the blockchain, designating the second token as valid.

17. The method as defined in claim 15, further including, in response to a failed match of the selected first or second artifact data in the blockchain, designating the second token as unverified.

18. The method as defined in claim 17, further including removing the second token from the token storage of the apparatus to prevent unauthorized access to digital services.

19. The method as defined in claim 17, further including invoking generation of a third token to replace the unverified second token, the third token based on third artifact data.

20. The method as defined in claim 15, further including applying at least one of a random or pseudo-random selection of the first or the second artifact data from the device artifact storage.

* * * * *